2,998,432
ETHYLENE OXIDE ADDUCTS OF EPOXY-
CONTAINING FATTY ACIDS
Samuel W. Tinsley, South Charleston, and Paul S. Starcher, Charleston, W. Va., assignors to Union Carbide Corporation, a corporation of New York
No Drawing. Filed Sept. 22, 1958, Ser. No. 762,264
4 Claims. (Cl. 260—348)

The present invention relates to certain novel compositions of matter comprising ethylene oxide adducts of epoxy-containing fatty acids and alcohols and has for an object the provision of novel adducts which are particularly adapted for use as non-ionic surface-active epoxy-containing stabilizers for polyvinyl chloride dispersion resins.

The compounds of the invention can be conveniently represented by the following general formula:

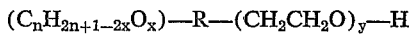

wherein the radical $(C_nH_{2n+1-2x}O_x)$ represents an epoxy-alkyl group containing $n$ carbon atoms, $2n+1-2x$ hydrogen atoms and $x$ oxygen atoms, $n$ represents a whole positive integer in the range of from 11 through 18, $x$ represents a whole positive integer in the range of from 1 through 3, R represents a member selected from the group consisting of carbonyloxy

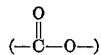

and methyleneoxy, (—$CH_2$—O—), groups and $y$ represents a positive integer in the range of from 5 through 15.

The compounds of the present invention are prepared by reacting the ethylene oxide adducts of mono-, di-, and triolefinically unsaturated aliphatic monocarboxylic fatty acids and monohydric alcohols containing from 12 through 19 carbon atoms with a peracid such as peracetic acid at temperatures of from about —10° C. to about 85° C.

The amount of peracid employed to produce the epoxide is not a critical feature of the invention. Stoichiometric to excess peracid can be employed as desired. It is preferred to employ an excess of peracid to insure complete epoxidation and drive the reaction to completion.

The peracids which have been found suitable for use include peracetic acid, perbenzoic acid, monoperphthalic acid and the like. Peracetic acid, however, is preferred because of its ready availability and low cost.

The ethylene oxide adducts of mono-, di-, and triolefinically unsaturated aliphatic monocarboxylic acids and monohydric alcohols are readily prepared by the addition of ethylene oxide to the acid or alcohol in the presence of a basic catalyst such as sodium hydroxide or potassium hydroxide at an elevated temperature preferably in the range of from 150° C. to 160° C. Ethylene oxide addition is continued and reaction conditions are maintained until the cloud point of a sample of the reaction mixture falls in the range of about 20° C. to about 70° C.

Thereupon the reaction is stopped, the catalyst is neutralized and the reaction mixture is stripped of all volatile materials preferably by distillation and the product accepted as a residue product. The residue products can be employed directly in the epoxidation reaction described supra or further purified as desired.

Among the mono-, di-, and triolefinically unsaturated aliphatic monocarboxylic acids and monohydric alcohols which are adapted for use in the manufacture of the non-ionic surface-active epoxy stabilizers of this invention are oleic acid, linoleic acid, linolenic acid, lauroleic acid, myristoleic, palmitoleic acid, oleyl alcohol and linoleyl alcohol. In general, the alcohols or acids are available as mixtures of the respective acids or alcohols, such as are normally available as soybean oil fatty acids, linseed oil fatty acids, cottonseed oil fatty acids, tall oil fatty acids and the like as well as the corresponding alcohols obtained by the reduction of the aforementioned fatty acids with sodium and ethanol according to known procedures. It is not necessary to separate the respective acids or alcohols or the corresponding adducts prior to epoxidation since the epoxidized mixtures function as well as the specific compounds as non-ionic surface-active epoxy stabilizers.

The following examples are provided to illustrate the practice of the invention. In the following examples the reported cloud point is determined by taking a small sample of the reaction mixture and making a water solution thereof containing about 0.2 weight percent of the reaction mixture. The solution is then warmed up slowly and the temperature at which the solution becomes cloudy is taken as the cloud point.

EXAMPLE I

*Preparation of the ethylene oxide adduct of $C_{18}$ unsaturated fatty alcohols*

A mixture of 260 grams of "Unadol 40" (a mixture of unsaturated fatty (oleyl and linoleyl) alcohols obtained by the reduction of soybean oil; iodine value, 136.8; acetyl value, 186.6; marketed by Archer-Daniels-Midland Co.) and 10.4 grams of potassium hydroxide was heated to 120° C. and a slow stream of nitrogen was bubbled through the mixture to remove water. After evolution of water had ceased the nitrogen stream was stopped and a stream of ethylene oxide vapor was introduced through a diffuser while maintaining the temperature at 120° C. When a total of 370 grams of ethylene oxide had been introduced the cloud point of the mixture was 53° C. The catalyst was neutralized with a methanol solution of phosphoric acid, the methanol and other volatiles were removed by vacuum stripping, and the residue product (593 grams) was filtered to remove salt. The increase in weight indicated that an average of 7.6 molecules of ethylene oxide per mol of alcohol had been added. The iodine number of the product was 62.1.

EXAMPLE II

*Preparation of the epoxide of the ethylene oxide adduct of $C_{18}$ unsaturated alcohols*

A portion (102 grams) of the product from Example I was heated to 40° C. and stirred while adding 87 grams of a 28 percent solution of peracetic acid in ethyl acetate dropwise over a 25-minute period. After an additional 6-hour reaction period at 40° C. an analysis for peracetic acid indicated that the reaction was essentially complete. The excess peracetic acid and other volatiles were removed by co-distillation with ethylbenzene. The residue product was pot-stripped to a temperature of 100° C. at 4 mm. pressure. The resulting polyethylene glycol mono-(epoxystearyl) ether was a light tan liquid having a cloud point of 56° C., an oxirane oxygen content of 1.6 percent, and an iodine number of 8.

EXAMPLE III

*Preparation of an ethylene oxide adduct of soybean oil fatty acids*

A mixture of 500 grams of distilled soybean oil fatty acids containing oleic and linoleic acids and 0.9 gram of sodium hydroxide dissolved in a methanol-water solvent was heated to 140° C. under 40 mm. pressure to remove the volatiles. After removal of the volatiles the temperature was raised to 155° C. and ethylene oxide was bubbled in slowly through a diffuser. The ethylene oxide addition was continued for 26 hours until the cloud point was 67° C. and 741 grams of oxide had been added, corresponding to an average of 9.4 mols of ethylene oxide per mol of acid. The iodine number of the product was 44 and the acidity was almost nil.

EXAMPLE IV

*Preparation of the epoxide of the ethylene oxide adduct of soybean oil fatty acids*

To 287 grams of the adduct from Example III was added dropwise 222 grams of a 25.7 percent solution of peracetic acid in ethyl acetate over a period of about one hour at 40° C. After an additional reaction period of 3 hours an analysis for peracetic acid indicated the reaction to be essentially complete. The volatiles were removed by co-distillation with ethylbenzene and the resulting residue product was pot-stripped to a temperature of 105° C. at 3 mm. pressure. There was obtained 298 grams of product having a cloud point of 53° C., an oxirane oxygen content of 1.6 percent, and an iodine number of 8.4.

What is claimed is:

1. Polyoxyethylene glycol monoepoxystearate having at least 5 and no more than 15 oxyethylene units per molecule.

2. Polyoxyethylene glycol diepoxystearate having at least 5 and no more than 15 oxyethylene units per molecule.

3. Polyoxyethylene glycol triepoxystearate having at least 5 and no more than 15 oxyethylene units per molecule.

4. Compositions of matter consisting of compounds of the formula:

$$(C_nH_{2n+1-2x}O_x)-\overset{O}{\underset{\|}{C}}-O-(CH_2CH_2)_y-H$$

wherein the radical $(C_nH_{2n+1-2x}O_x)$ represents an epoxyalkyl group containing $n$ carbon atoms, $2n+1-2x$ hydrogen atoms and $x$ oxygen atoms, $n$ represents a whole positive integer selected from the range of 11 to 18, $x$ represents a whole positive integer selected from the range of 1 to 3 and $y$ represents a positive integer in the range of from 5–15.

References Cited in the file of this patent

UNITED STATES PATENTS

| | | |
|---|---|---|
| 2,458,484 | Terry et al. | Jan. 4, 1949 |
| 2,779,771 | Phillips et al. | Jan. 29, 1957 |
| 2,836,605 | Rowland et al. | May 27, 1958 |

OTHER REFERENCES

Greenspan et al.: Ind. Eng. Chem., vol. 45, December 1953, pp. 2722–2726.

UNITED STATES PATENT OFFICE

CERTIFICATE OF CORRECTION

Patent No. 2,998,432                  August 29, 1961

Samuel W. Tinsley et al.

It is hereby certified that error appears in the above numbered patent requiring correction and that the said Letters Patent should read as corrected below.

Column 4, lines 6 to 8, the formula should appear as shown below instead of as in the patent:

$$(C_nH_{2n+1-2x}O_x)-\overset{\overset{O}{\|}}{C}-O-(CH_2CH_2O)_y-H$$

Signed and sealed this 10th day of April 1962.

(SEAL)
Attest:

ERNEST W. SWIDER                        DAVID L. LADD
Attesting Officer                    Commissioner of Patents